US008013569B2

(12) United States Patent
Hartman

(10) Patent No.: US 8,013,569 B2
(45) Date of Patent: Sep. 6, 2011

(54) RENEWABLE ENERGY VEHICLE CHARGING STATION

(75) Inventor: Paul Harvey Hartman, Chardon, OH (US)

(73) Assignee: Sustainable Structures LLC, Avon Lake, OH (US)

( * ) Notice: Subject to any disclaimer, the term of this patent is extended or adjusted under 35 U.S.C. 154(b) by 431 days.

(21) Appl. No.: 12/381,104

(22) Filed: Mar. 6, 2009

(65) Prior Publication Data

US 2010/0225266 A1 Sep. 9, 2010

(51) Int. Cl.
*H02J 7/00* (2006.01)
*F03D 9/00* (2006.01)
*G06Q 40/00* (2006.01)
*E04C 3/00* (2006.01)

(52) U.S. Cl. ..... 320/109; 320/101; 320/108; 180/165.1; 307/10.1; 414/332; 414/333

(58) Field of Classification Search .................. 320/101, 320/108, 109; 180/165.1; 307/10.1
See application file for complete search history.

(56) References Cited

U.S. PATENT DOCUMENTS

| | | | |
|---|---|---|---|
| 4,048,947 A | 9/1977 | Sicard | |
| 4,180,367 A | 12/1979 | Drees | |
| 4,430,044 A | 2/1984 | Liljegren | |
| 5,499,904 A | 3/1996 | Wallace | |
| 5,847,537 A * | 12/1998 | Parmley, Sr. | 320/109 |
| 5,926,004 A * | 7/1999 | Henze | 320/109 |
| 7,248,018 B2 * | 7/2007 | Sanders et al. | 320/109 |
| 7,329,099 B2 | 2/2008 | Hartman | |
| 7,329,965 B2 | 2/2008 | Roberts et al. | |
| 7,344,353 B2 | 3/2008 | Naskali et al. | |
| 7,377,344 B2 | 5/2008 | Barske | |
| 7,381,146 B2 | 6/2008 | Gouda | |
| 7,393,177 B2 | 7/2008 | Rahai et al. | |
| 7,412,309 B2 | 8/2008 | Honda | |
| 7,439,710 B2 | 10/2008 | Ishishita | |
| 7,443,117 B2 | 10/2008 | Egami et al. | |
| 7,459,880 B1 | 12/2008 | Rosen | |
| 7,471,064 B2 | 12/2008 | Sobue et al. | |
| 7,476,987 B2 | 1/2009 | Chang | |
| 7,482,779 B2 | 1/2009 | Suzuki | |
| 7,486,034 B2 | 2/2009 | Nakamura et al. | |
| 2009/0062967 A1 * | 3/2009 | Kressner et al. | 700/286 |
| 2009/0315393 A1 * | 12/2009 | Yeh | 307/10.1 |

OTHER PUBLICATIONS

Pawsey, N., Dev't and Evaluation of Passive Variable-Pitch Vertical Axis Wind Turbines, Thesis: U. New South Wales, AUS, Nov. 2002.
Flowind Corp., Final Project Report: High Energy Rotor Dev't, Test & Evaluation, Sandia Labs, SAND96-2205, USA, Sep. 1996.

* cited by examiner

*Primary Examiner* — Patrick Assouad
*Assistant Examiner* — Steve T Chung

(57) ABSTRACT

A renewable energy system for directly charging electric and hybrid vehicles is shown for areas with modest wind resources and/or solar resources. The invention consists of a composite stanchion for mounting on a base in a parking lot that is both capable of supporting a medium sized wind turbine (or solar array) and serving as a battery storage and charging control station. Significant improvements in blade pitch adjustment and cost reduction for wind turbine blades allow the system to operate at an acceptable cost in areas with modest winds and avoid the need for remotely supplied renewable electricity in areas of high population density. In turn, this will allow for increased electrical grid stability through increased use of distributed generation.

20 Claims, 9 Drawing Sheets

RENEWABLE ENERGY VEHICLE CHARGING STATION

BACKGROUND

1. Field of the Invention

This invention relates to distributed energy systems for populated areas; specifically a system for hybrid or electric vehicle charging based on an improved vertical axis wind turbine and support structure.

2. Prior Art

Recent emphasis on energy independence, economics and the effects of climate change has led to a re-thinking of the rate of conversion to alternative fuel supplied vehicles. Nearly all major auto makers presently have or are planning hybrid, plug-in hybrid and all electric vehicles in addition to expanding lines of natural gas fueled and alcohol fueled cars into the US from established markets elsewhere.

Many recent patents on vehicle charging have centered on transmission of power within vehicles and electrical charging dynamics and controls: (Matsubara U.S. Pat. No. 7,426,973, Barske U.S. Pat. No. 7,377,344, Gouda U.S. Pat. No. 7,381,146, Honda U.S. Pat. No. 7,412,309, Ishishita U.S. Pat. No. 7,439,710, Egami U.S. Pat. No. 7,443,117, Sobue U.S. Pat. No. 7,471,064, Suzuki U.S. Pat. No. 7,482,779, Nakamura U.S. Pat. No. 7,486,034).

Where inventors have focused on directly charging batteries with renewable energy, such as Rosen U.S. Pat. No. 7,459,880 and Chang U.S. Pat. No. 7,476,987, again the electrical aspects of the design dominate the specifications.

Better Place, a firm with a number of international and domestic electric car charging/parking lot installations, utilizes alternating current supply posts put in as branch circuits to accomplish a goal of supplying purchased 'green electricity' generated remotely from the site to the vehicles. Sources of economical green electricity in proximity to points of use are extremely rare.

Very large, three blade horizontal axis turbines (HAWT) are the central hope for use in supplying pollution free electrical demand to meet the perceived needs of the national distribution grid. But they require a massive thickness of expensive composite materials at the blade root and roughly 600 man-hours of labor for each blade.

They are not economical in areas with moderate winds because of the cost elements cited above, the cost of the heavy nacelle assembly and its structural support, costs of the grid interface and the mechanism for directing the turbine into the wind. As manufacturers have steadily increased the size of the turbines and built more of them, cost per kilowatt hour has gone up . . . not down.

Rather than addressing the obvious limitations of HAWT, many are recommending trans-continental transmission from high wind areas to high population areas to meet growing energy needs. One drawback of this approach was illustrated within the report on the August 2003 power outage: Electricity purchased from utilities outside of service areas grew from 18% of total use in 1989 to about 40% of total use in 2002. Moving enough electricity across the country to both meet existing needs and electric vehicle needs from wind sites in the Great Plains area will require very expensive high voltage transmission lines and corridors. Writing off functioning coal fired power plants before they are obsolete is beyond the economic capabilities of the country.

Every kilowatt hour (kWh) of energy delivered to an end user, requires of 3.23 kilowatt hours of coal energy at a power plant. As stated by the Department of Energy, 'energy security' is best provided by distributed energy sources. Therefore, the use of wind energy in distributed power generation in many applications including replacement of fossil fuels has emerged as an important new option. Hartman (U.S. Pat. No. 7,329,099, 2008) shows a vertical axis design for generating heat to displace natural gas in HVAC systems and to cut coal-based electrical power emissions in existing power plants with nearby off-shore wind.

A number of earlier inventions for vertical axis turbines obtained good efficiency and self-starting capability through pivoting blades to optimize lift throughout the rotational cycle. This permitted lower costs through reducing materials usage relative to horizontal turbines. The mechanical complexity of the pitch control, however, may have been a factor contributing to the displacement of vertical turbines by horizontal turbines over the past two decades.

Sicard (U.S. Pat. No. 4,048,947, 1979) used a combination of counterweights and aerodynamic forces to orient blades to minimize drag around the circuit of rotation of a vertical turbine. Blades illustrated by Sicard are simple pipes to ease the mechanical requirements of the pivoting motion with trailing edges bonded to the pipe sections to form an airfoil.

Drees (U.S. Pat. No. 4,180,367, 1979) achieved self-starting characteristics in the 'Cycloturbine' by imposing an orientation at the retreating blade position perpendicular to the ambient wind direction at low starting speeds. He had an orientation parallel to prevailing wind at operational wind speeds. Mechanical actuation of the system was by cam and pushrods to each blade . . . not a significant improvement on the internal combustion engine in terms of simplicity.

Liljegren (U.S. Pat. No. 4,430,044, 1984) utilized similar cams and pushrods to control the pitch of the blades of a vertical axis turbine during the rotational cycle. This system differs from Drees in orienting both the blade positions approaching and receding from the prevailing wind roughly parallel to the tangent of the rotational circle to limit drag; Aiming for lift-based power throughout the rotational cycle and a wider range of operational speeds of the machine.

Given that improvements in vertical turbine performance can be achieved with small amounts of pitch variation, (Thesis, Pawsey, 2002), it is likely that complex mechanical drive mechanisms for pitch control used in these earlier inventions could be supplanted by simpler alternatives.

Vertical axis designs using drag based impellers have emerged to supply small amounts of site generated electricity in buildings. Naskali (U.S. Pat. No. 7,344,353, 2008) and Rahai (U.S. Pat. No. 7,393,177, 2008) are two examples of improvements on the earlier Savonius style. While effective, the complex shapes and large chords of these reactive surfaces limit the scale of the systems and increase unit electricity costs due to the complex forms.

While the approach to the orientation of the approaching and receding blades seen in Liljegren is appropriate for vertical turbines with two or three blades and low solidity, it is based on the assumption that the prevailing wind is the same as the wind direction moving around and through a vertical turbine. Studies of airflow around cylinders and consideration of the Magnus effect show that this assumption may be inadequate to capture the flow field of a vertical turbine, particularly at high solidity and/or multiple blades.

Roberts (U.S. Pat. No. 7,329,965, 2008) recognizes the importance of considering flow through the turbine assembly in his design for an "Aerodynamic hybrid" vertical turbine; but is also limited by the size and fabrication complexity factors discussed above for drag type turbines.

FloWind Inc. in conjunction with Sandia Labs conducted experiments in the late 1980s/early 1990s to reduce cost and improve performance in Darrieus style vertical turbines used in early utility installations by replacing extruded aluminum blades with composite pultrusions, (SAND 96-2205, 1996). While reasons are unclear; the newer, more elongated turbine rotor design and Sandia blade aerodynamics did not result in significantly higher efficiency or any reduced cost.

Wallaces pultrusion (U.S. Pat. No. 5,499,904 to FloWind) was large and complex, with a chord of 27 inches and four cavities in the profile separated by web portions. Production of the system using the pultrusion process was likely difficult. The field bending of the 158 ft long turbine blades into a troposkein curve was also a limitation on practicality.

Hartman (U.S. Pat. No. 7,329,099, 2008) produced a dome structure based on straight blades used as dome struts with an initial approach to variable pitch throughout the rotation. The two cavity pultrusion was simpler than that of Wallace, but there remain some issues with the design of the blade—hub attachment system and the need for simple, adaptable blade pitch control.

The new emphasis on distributed power opens up a number of new wind applications; such as local recharging of hybrid or all-electric vehicles and mid-scale wind power generation at industrial/commercial buildings, if significant cost reduction over HAWT electrical generation and drag-based, complex shape, vertical axis units could be demonstrated.

OBJECTS AND ADVANTAGES OF THE INVENTION

Accordingly, one object of the invention is to produce low cost, efficiently produced blades for use in vertical axis turbines. A second object of the invention is to replace complex systems of mechanical pivots, stops/springs and cams with simpler, more robust systems to allow pitch control and pivoting of turbine blades through the rotational cycle of a turbine. Practical systems suited to addressing emerging needs for locally produced renewable energy in populated areas with Class 2 and Class 3 (moderate) winds are another object of the invention.

SUMMARY OF THE INVENTION

To address these objectives, a first aspect of the invention is to provide a single cavity, pultruded airfoil shape that can be combined with a simple I beam pultruded profile to produce a very low cost composite blade for wind turbines.

This two part assembly strategy allows for blade angles relative to the perimeter of turbine rotation that can be easily adjusted to allow for varying amounts of heel-in or heel-out angle that form the center point of a blade pivoting system.

A second aspect of the invention is the use of a composite section as a replacement for the complex pivot shaft and stops/springs in prior art vertical blade pivoting assemblies. The composite functions as a simple torsion spring during the rotational cycle and an easy tie point to hub junctions for the blades in a turbine rotor assembly.

A third aspect of the invention is a stanchion support/ energy vending station that can be placed in service in an existing parking lot to serve as an infrastructure element in the move toward a practical, modular infrastructure for rechargeable electric cars and plug-in hybrid vehicles. Instances supporting both wind turbines and solar collector arrays are disclosed in the specifications.

The unique stanchion allows ease of installation to concrete bases found in many parking lots for lighting. It also serves as an electrically insulating housing for batteries and lightweight structural member. Dual use for night lighting of lots without additional grid demand and an emergency power supply for nearby buildings can also be achieved.

DETAILED DESCRIPTION

Support Stanchion with Integrated Vehicle Charging System

FIGS. 1 through 5 disclose a preferred embodiment of the invention: A composite stanchion 50 and associated electric equipment with the capability to both support a vertical axis wind turbine rotor 21 and to store/supply energy for hybrid or electric vehicles 79. Stanchion 50 can also support an elevated solar array 30 having an adjustable pitch mechanism for optimum solar collection capability.

Through public facilities to provide for direct supply of vehicle energy from renewable sources; new demand on an already stressed grid structure and carbon emissions from vehicle sources can both be minimized. Additionally, the renewable energy supplied from the invention can be easily utilized for emergency power supply to a nearby building or local grid area for greater energy assurance.

Figure 1:
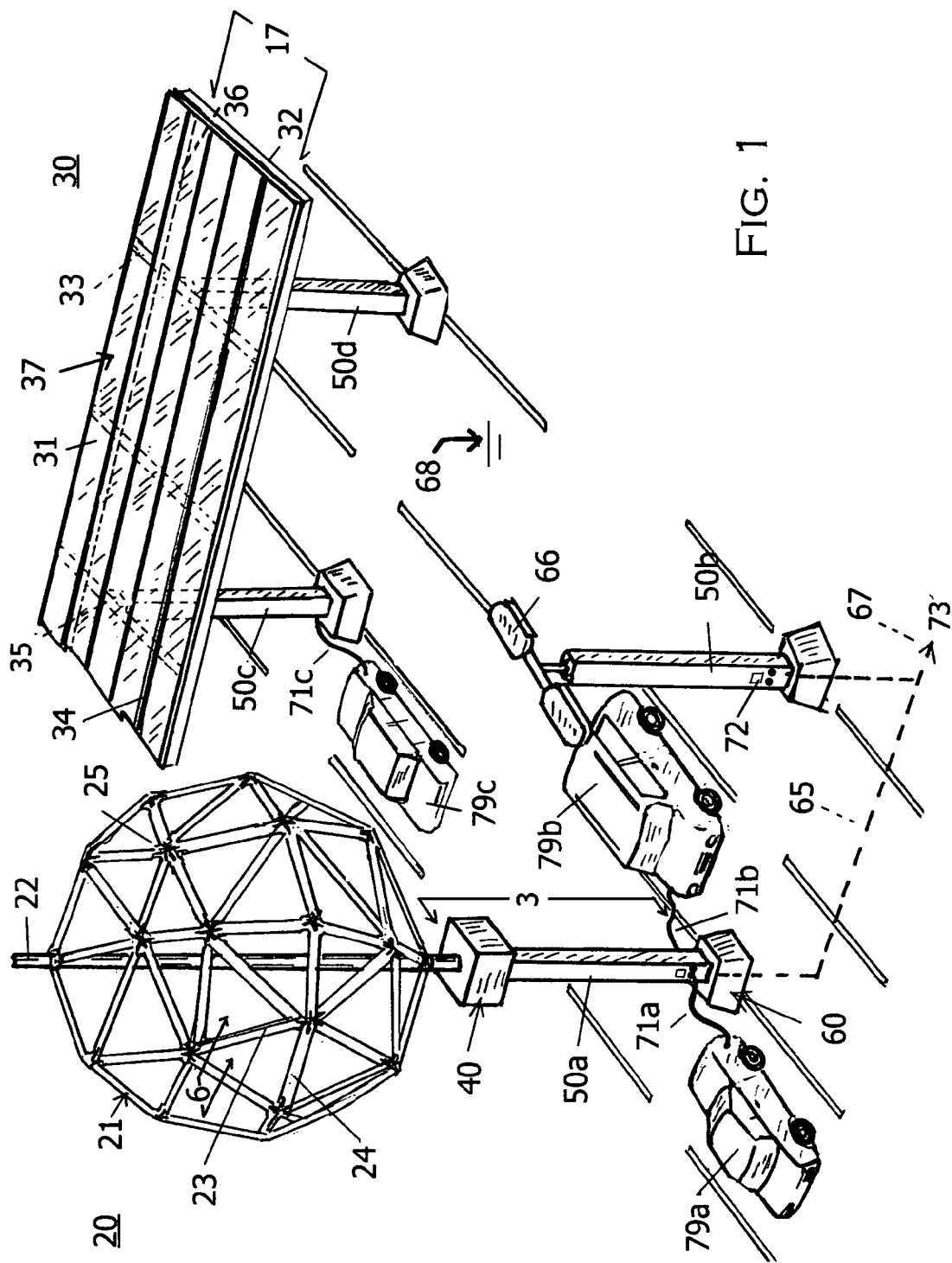
FIG. 1 is a birds eye view of a parking lot area equipped with both wind and solar energy vending systems for charging vehicles.

FIG. 1 is an overview of a parking lot 68, with vehicles 79a, b and c are in the process of being charged through cables 71a, b and c with power supplied by support stanchions 50a and 50c. Wind turbine assembly 20 consists of a wind turbine rotor 21, a housing 40, a stanchion 50a and a base assembly 60. Although a vertical turbine design based on U.S. Pat. No. 7,329,099 is illustrated in the figure, another wind turbine design could be used in conjunction with the support stanchion and energy supply system.

Support stanchion 50b carrying lighting fixture 66 is shown with buried conduit 65 for utilization of energy generated by turbine assembly 20 for electrical energy storage in stanchion 50b or night lighting of the parking lot. Fixture 66 is preferably a DC supply, high intensity discharge luminaire capable of operation off stanchion supplied voltage at high efficiency.

An extension 67 of conduit 65 can be utilized to connect to and utilize energy from a grid connected panel 73 associated with the lot for the purpose of supplying backup power to any of the stanchions, 50 a through d for charging vehicles or lighting in time of low renewable energy supply. Alternatively, extension 67 can be configured to deliver excess electrical supply to a building or service supply grid as needed through panel 73.

Solar array 30 consists of a series of photovoltaic solar structural panels 31 supported by a perimeter frame 32 and intermediate beams 33 tied to stanchions 50c and 50d. Integral purlins 36 within panels 31 provide tie members between the beams, which are in turn are connected to stanchions 50c and 50d with a hinged connector 35 to control the pitch of the array. Inter-panel connectors 34 add to the diaphragm strength/racking resistance of the overall solar platform deck 37 in areas with seismic structural concerns.

Although a 'portal' assembly of stanchions and deck is shown in the illustration, individual support of deck sections with individual stanchions could also be achieved with the system. It is not intended to limit the scope of the invention to either a pivoting or fixed pitch assembly of the solar collector deck.

Figure 6:
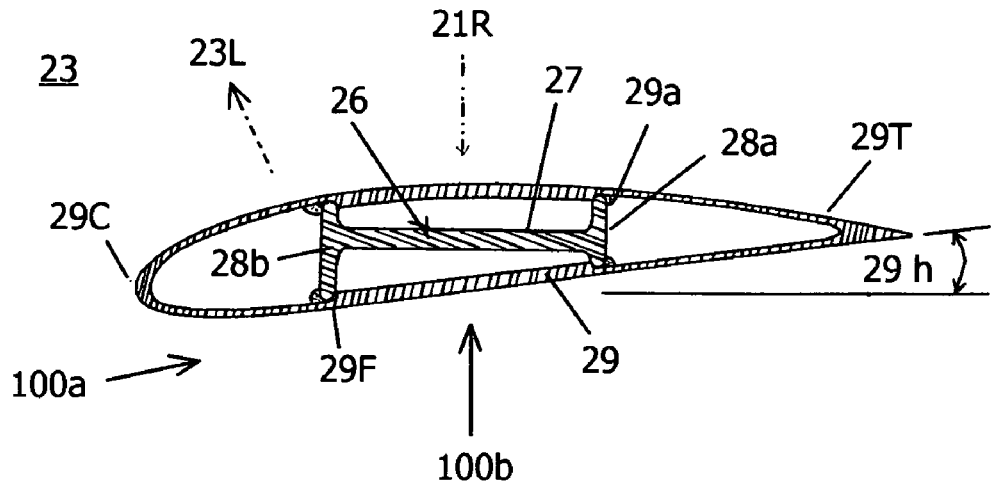
FIG. 6 is cross section through the composite blade structure of the invention.
Figure 7:
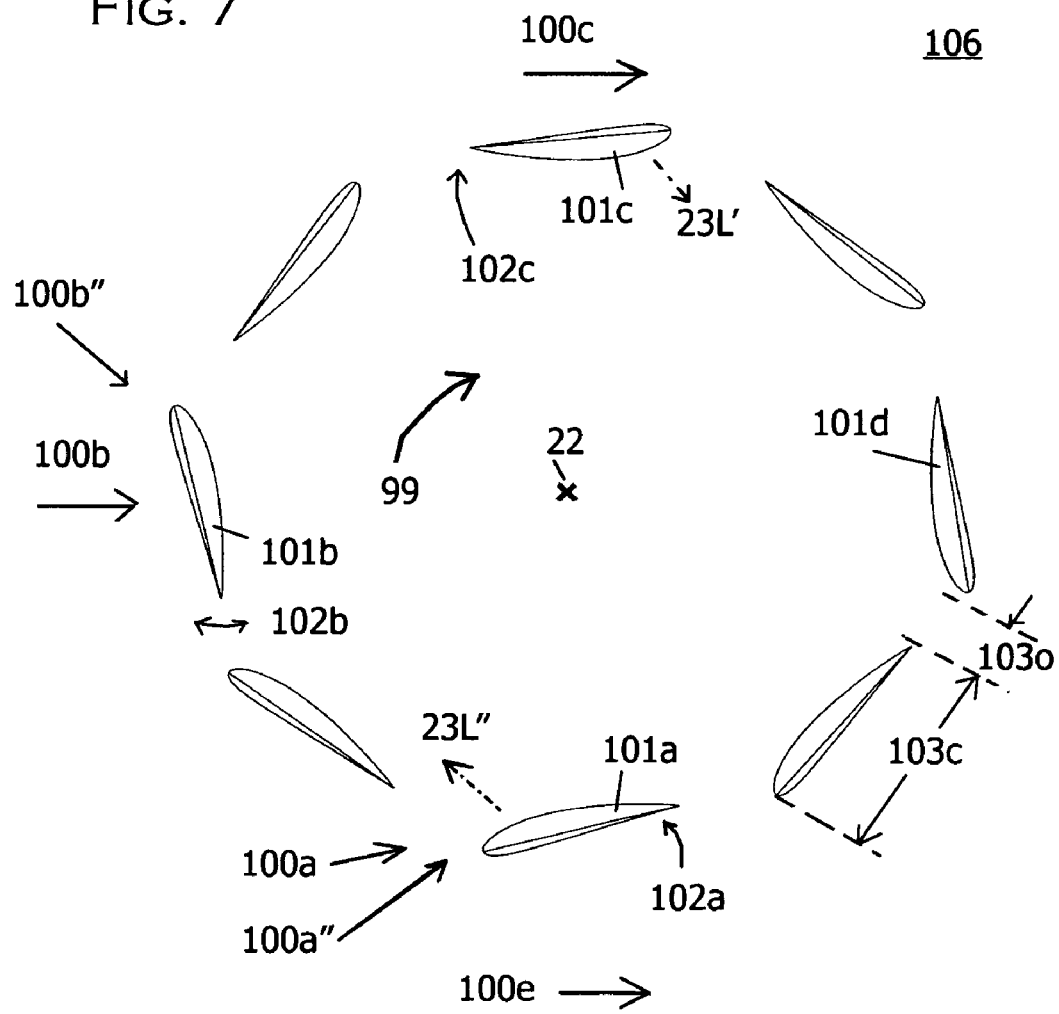
FIG. 7 is a schematic illustration of the pivoting blades throughout a rotational cycle.
Figure 8:
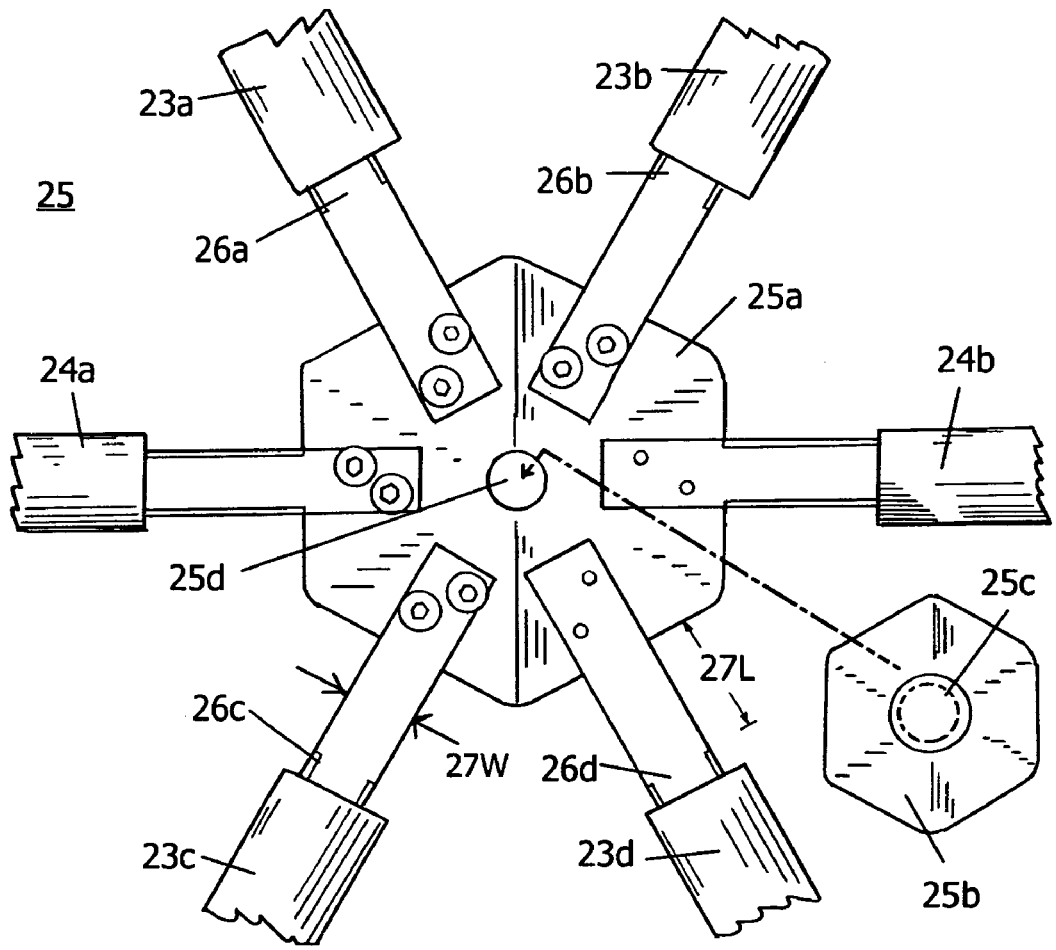
FIG. 8 is an isometric assembly drawing of a turbine blade hub.

A more detailed description of improved turbine blades 23, hub assembly 25 and information on a simple blade pitch control system 106 is provided in the specification associated with FIGS. 6 through 16. The connection of mast 22 through housing 40 to generator 45 is detailed in FIG. 2. Non-blade dome struts 24 are also shown in FIGS. 1 and 8.

Figure 2:
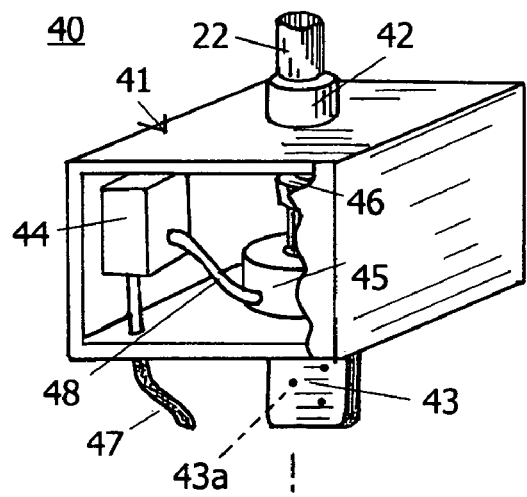
FIG. 2 is an isometric assembly drawing of the energy storage/structural stanchion and generator housing for the wind turbine shown in FIG. 1.
Figure 2:
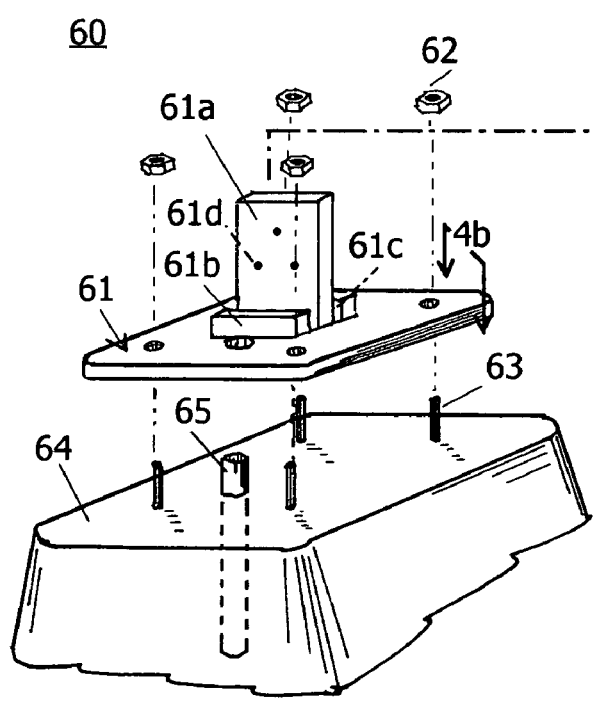
Figure 2:
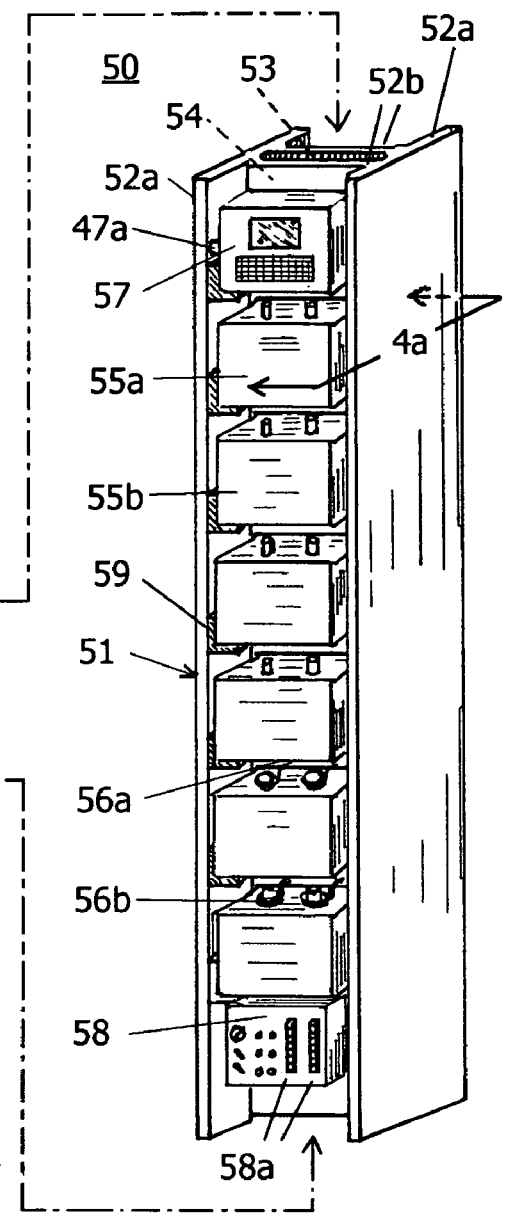

FIG. 2 is an assembly drawing of wind turbine assembly 20 divided into sections according to sketches of a housing 40, a stanchion 50 and a base assembly 60. Mast 22 passes through a housing frame 41 by means of a bearing/seal assembly 42 and ends at a rotary coupling 46 to the shaft of a direct current generator 45. Power output of generator 45 is conducted into power conditioning panel 44 through wiring 48. Conditioned power is then supplied to programmable controller 57 through flexible conduit 47 which is later attached at conduit fitting 47a to stanchion 50. Another type of generator, such as a synchronous one, could be used within the scope of the invention.

Anchor blade 43 is structurally bonded to housing 41 at the bottom and is later inserted into a slot 53 between double web sections 52b of pultruded composite profile 51. Web sections 52b are connected to the center points of flanges 52a to make up the structural support of stanchion 50.

The stanchion carries deep discharge batteries 55a, 55b . . . etc in the cavity formed between flanges 55a and web face 54. The batteries are supported from below by brackets 59 which are bonded to the flanges. Two stacks of batteries can be employed in the stanchion, one on either side of web sections 52b. Wire connections 56a are affixed to battery terminals by terminal connectors 56b at one end and selectively connected to either controller 57 to optimize charging or controller 58 to transfer energy to vehicles or other energy use components.

Programmable controller 58 at the bottom of the battery stack connects to user interface 72 for vehicle charging, or to lighting and other storage locations such as stanchion 50b or panel 73 by means of modular connector strips 58a.

During field assembly, base assembly 60 is attached to concrete base 64 by means of threaded studs 63 and nuts 62. A base plate 61 has post 61a and alignment blocks 61b bonded to it to form the base assembly. Alignment blocks 61b are offset from post 61a to leave gaps 61c which are slightly wider than web sections 52b (which are ultimately positioned in the gaps).

In the installation process, profile 51 is mounted on post 61a by means of slot 53 and secured in place, Housing 40 is later installed by means of anchor blade 43 as described above. Holes in parts 61a and 43, (61d and 43a respectively), correspond to additional bolting during assembly that cannot be seen in the FIG. 2. Conduit 65 passes through a hole in plate 61, (not numbered) to allow connection to other components in the overall system.

Figure 3:
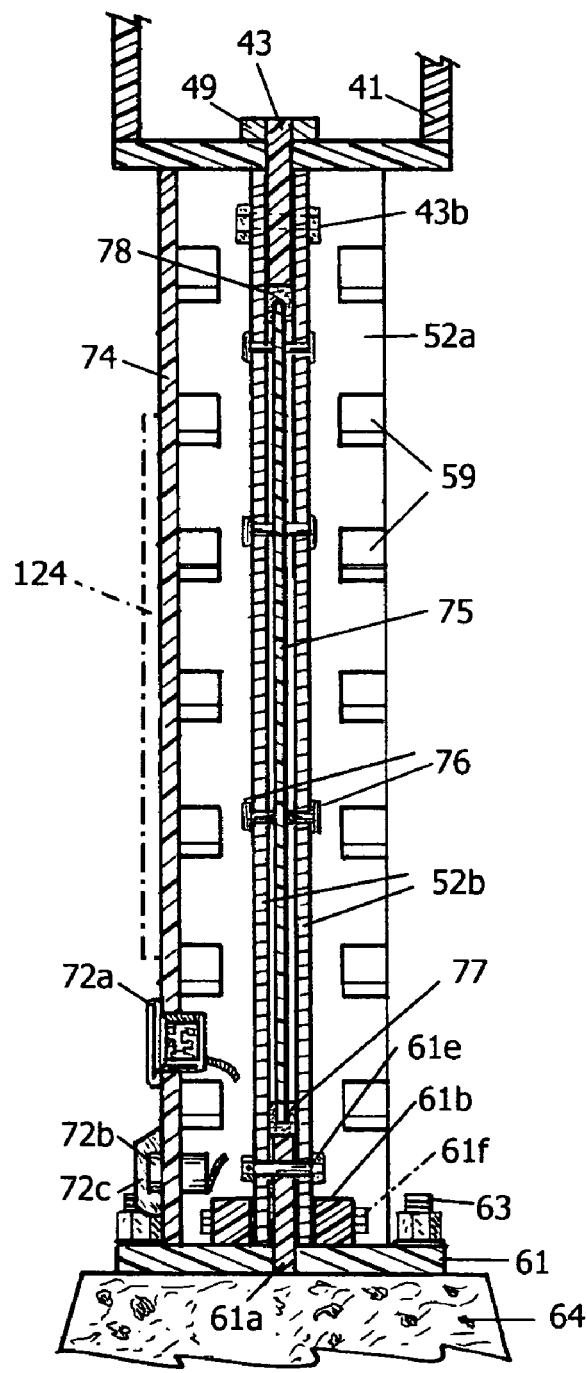
FIG. 3 is a cross section of the stanchion showing additional electrical and structural components of the renewable energy vehicle fueling system.

FIG. 3 is a cross section through stanchion 50a detailing additional structural and electrical features of the invention not shown earlier. Anchor blade 43 is shown passing through the bottom of housing frame 41 and additionally bonded to support blocks 49 inside of housing 40. Fastener 43b is shown securing the assembly through holes 43a. Ideally, the blocks, housing frame and anchor blade are connected by both adhesive bonding and dowel pinning with composite pins.

Similarly, post 61a is shown passing through plate 61 to secure the post to the base plate. Additionally blocks 61b to form a socket 61c for web sections 52b. The lower joint is bolted by means of fastener 61e passing through the web sections 52b and post 61a. Additionally, optional fastener 61f is shown passing through blocks 61b, profile 51 and post 61a. Alternatively, base 61 and stanchion 51 can be pre-assembled with adhesive bonding means and shipped to the field assembly site as a single unit.

A facing panel 74 is shown attached to composite profile 51 with screen module 72a and charging plug 72b of user interface 72 passing through it. Spring loading plug cover 72c is also shown in the figure. Wiring from both the screen module and the charging plug connects to controller 58 in the final assembly.

Facing panel 74 can be optionally surfaced with a narrow photovoltaic panel 124, shown as a dash dot line in FIG. 3 to supplement wind power in the summer and at other times of lower wind velocity. The connection to the charging system could either be through controller 57 or controller 58. Photovoltaic panels 124 can also be placed on flange surfaces of stanchion 50 or appropriate surfaces of housing 40 based on the climatology of the site.

Both controllers 58 and 57 must connect individually to each of the batteries in the stanchion to adequately address the needs to charge and discharge power as needed. Additionally, control signals and communications functions between components must be wired to realize the design for the charging station.

Circuit board 75 is shown mounted in slot 53 of composite profile 51 to provide these connections through threaded posts 76 passing through web sections 52b to contact the appropriate wiring paths. Insulating supports 77 and 78 serve to align board 75 vertically in slot 53 while threaded posts 76 position and secure the board evenly between the web sections. Individual connecting wires 56a (FIG. 2) are installed to posts 76 to complete connections between components.

Figure 4A:
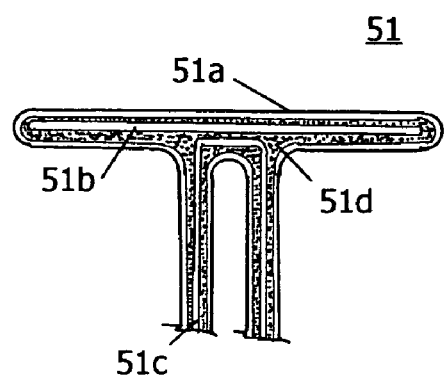
FIGS. 4a and 4b are cross sections through two different types of composites used in the invention.

FIG. 4a is a cross section through pultruded stanchion profile 51 illustrating the composite structure. In an application requiring both transverse and longitudinal strength outer layer 51a would typically be a triaxial stitched fiberglass fabric. Unidirectional glass roving layers 51d typically separate layers of glass fabric and a very useful in filling corner areas such as the one at the end of the indicating arrow of character 51d. Both non-woven glass fabric and other glass fabrics such as stitched 0/90 fabrics can be used effectively in central layers 51b and 51c. A variety of resin materials such as epoxy, urethane, phenolic, polyester and vinyls are often used, with urethane often being the choice for high strength constructions and phenolic resins being chosen for fire safe constructions.

Figure 4B:
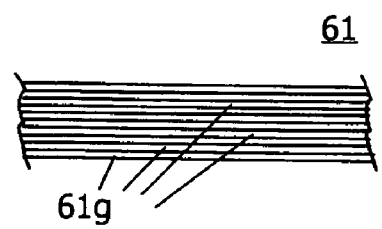

FIG. 4b is a cross section through laminated composite base 61 showing multiple layers 61g preferably composed of woven glass fabric. Commonly, these 'B-stage layers' made from partially cured epoxy or phenolic resin systems that are cut, stacked and laminated in a high temperature, high pressure presses to complete the polymerization process and form laminated composite base 61.

The resultant products have good bi-directional properties and compression strength for the application. Alternative reinforcement materials can include cellulose, other fibers derived from natural products and carbon fibers/fabrics, aramid and other high strength organic fibers and rock wool or fibers produced from lava. Although composite materials represent a preferred embodiment of stanchion 50 and base 61, these components could as easily be fabricated from steel, another commodity metal or from properly reinforced concrete materials. Stanchions fabricated from metals would not, however, have the desirable non-conductive and chemically resistant properties that would be desired in the renewable energy charging station.

Mode of Operation: Vehicle Charging System

Figure 5:
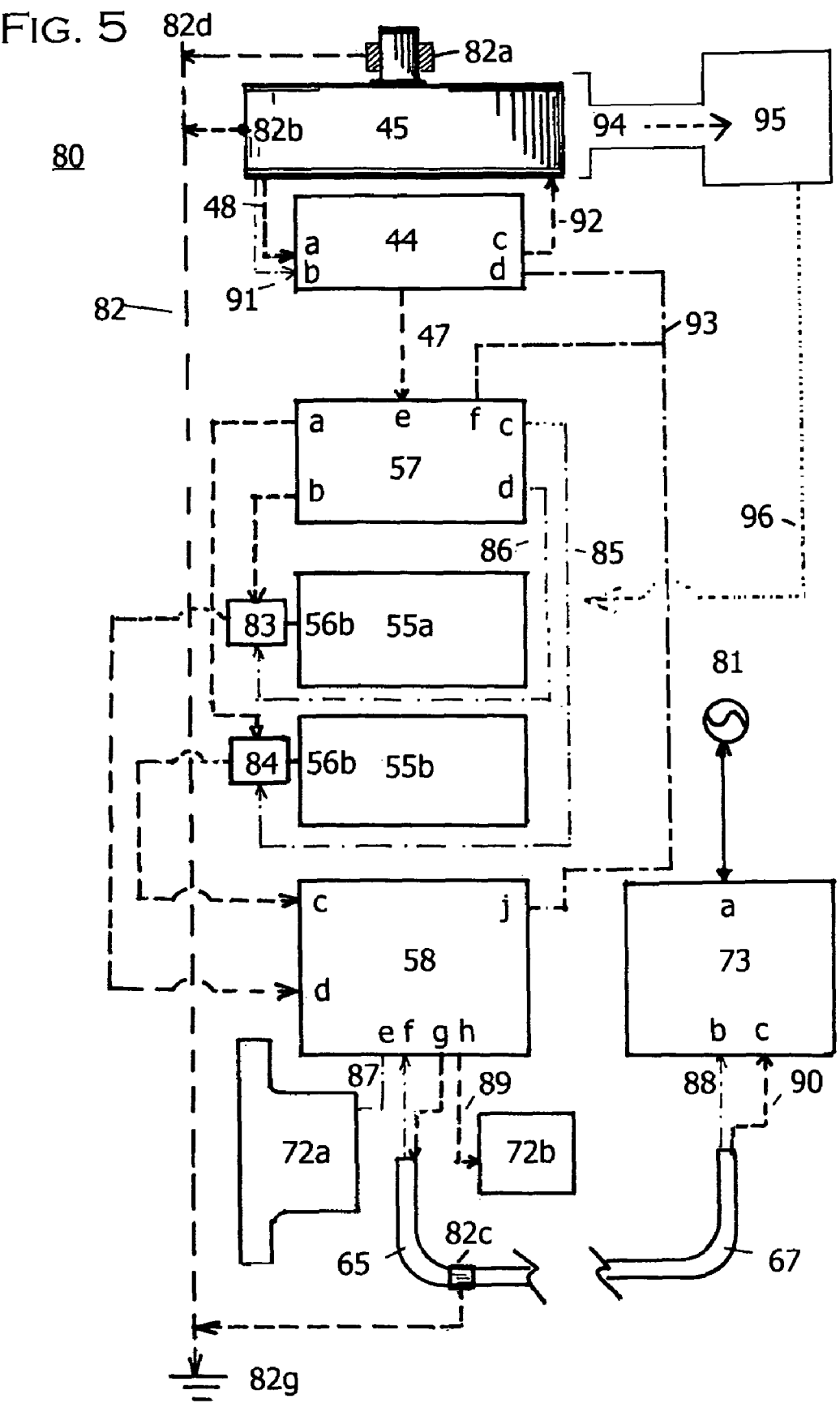
FIG. 5 is a process and instrument drawing of the control and electrical supply components and their interconnections for a wind turbine vehicle charging station.

FIG. 5 is a process and instrument drawing (PID) illustrating operation of a vehicle charging system 80. Direct current wiring is shown as dashed lines, communications and sensor signals are shown as dash-dot lines and solid lines indicate alternating current wiring. Within panel 44, the voltage from generator 45 is adjusted, sensors and logic controls for operation of generator 45 are received and implemented.

Line 48 connecting to terminal 44a is the power supply from the generator. Line 91 connecting to terminal 44b is an encoder signal from the generator to monitor rotational rate and terminal 44c supplies braking control to the generator through line 92. Terminal 44d of the panel communicates to both charging controller 57 and distribution controller 58 through data line 93. Conditioned power output from panel 44 is supplied through line 47 to charging controller 57.

Battery charging controller 57 is shown with connections to batteries 55a and 55b in the illustration although all the batteries in the stanchion assembly 50 are charged by controller 57 in practice. Battery 55a is shown with terminal 56b connected through switching relay 83 and battery 55b is shown with terminal 56b connected through switching relay 84.

In cold weather, waste heat from generator 45 and housing 40 can be picked up by ducts 94 and transferred using a blower 95 through channels 96 to the storage battery area to maintain battery EMF in the face of lower outside temperatures. Conversely, excess heat from both the stanchion 50 and the housing 40 can be vented out of these enclosed areas in hot weather to prevent overheating of key electrical components. Charging gases, if present, from the batteries can also be automatically vented by the system.

In the charging mode of operation, control outputs from terminals 57c and 57d are supplied to relays 83 and 84 for connection of the batteries to DC supply terminals 57a and 57b of the charging programmer. In the discharging mode of operation, relays 83 and 84 connect terminals 56b of the respective batteries to distribution controller 58 at terminals 58c and 58d. Controller 58 can discharge banks of batteries in voltages appropriate to the vehicle or energy end use connected by the demands on the system.

User interface display module 72a serves to advise the user of charging status at the stanchion and communicate credit card or other payment information to terminal 58e via data line 87. Given adequate power reserves and payment, controller 58 supplies DC electrical charging power at terminal 58h to plug 72b through line 89.

Other system needs and voltage requirements are evaluated at controller 58 based on communications from other parts of the system through port 58f connected to line 88. While a connection to grid connected panel 73 is shown in FIG. 4, a connection to lamp stanchion 50b could also be enabled through controller 58. In the illustration, DC voltage is supplied to panel 73 through line 90 from terminal 58g. Alternatively, panel 73 could have supplied DC voltage rectified from AC supply 81 to stanchion 50a.

Lightning protection for the electrical system is provided by line 82 routed to earth ground 82g. The generator shaft is provided with pick up brushes 82a connected to line 82 as is the conduit system at 65 through collar 82c. Generator case is connected at point 82b and the mast itself can be grounded through connection 82d. Ideally line 82 is routed around the enclosure provided by composite profile 51 and cover plates 74 in the final installation to provide added safety to the components and the vehicles.

DETAILED DESCRIPTION

Blade Construction and Pivoting Mechanism

FIGS. 1 and 6 through 16 show a second embodiment of the invention in the form of a low cost, high strength turbine blade construction with an integral blade pivoting mechanism 106 and hub attachment means. Turbine blades 23 and 110 show the use of a flat, composite torsion members to replace the complex systems of pivot rods, springs and cams used in prior art such as Drees.

By reducing the cost and weight of composite turbine blades and using them in vertical axis wind turbine rotors 21 and 108, savings can be achieved relative to HAWTs throughout the turbine including the rotor, housing, tower, support structure and assembly costs.

By simplification of the blade pivoting and assembly mechanism, good electrical generation efficiency with a more robust design for reduced maintenance can be achieved in areas with modest wind resources that are located in close proximity to where energy is being used.

Both of these improvements will lead to easily deployable, lower cost systems that can be mounted lower to the ground avoiding some of the restrictions and difficulties in mounting large utility grade HAWTs hundreds of miles from the point of use and hundreds of feet in the air.

The delays in creating transmission systems to move power across the country, the significant transmission losses and losses/costs associated with inverters to create AC power and later rectify to DC power for vehicle batteries can be avoided.

FIG. 6 is a cross section through blade 23 in FIG. 1 showing a two part assembly made of pultruded composite materials as described in FIG. 4a. An unsymmetrical I beam 26 is bonded to an airfoil profile 29 using adhesive 29a to form blade 23. Web section 27 of I beam 26 is integral to shorter flange portion 28a and longer flange portion 29b. The center points of the two flange portions are offset from one another and the mid-plane of web section 27 to create a heel-in angle 29h relative to the plane of web section 27 and the tangent of the rotational motion 99 of blade 23 about mast 22. Airfoil profile 29 is a cambered design similar to an NACA 4415 shape in cross section; but the invention is not intended to be limited to either this airfoil shape, a cambered design or a heel-in orientation in every application.

From a standing start and at low wind speeds, heel-in angle 29h allows blade 23 to add to rotational power when facing prevailing wind vector (arrow 100b) at blade position 101b in FIG. 7 through an impeller type of response to the air flow. The heel-in angle also allows an aerodynamic lifting force, arrow 23L, at startup in blade position 101a facing localized wind vector 100a.

Test comparisons with an un-cambered blade design and with a cambered design having a heel-out configuration at position 101a relative to prevailing air-flow direction 101b showed a lack of self-starting characteristics for a turbine rotor of the type shown in FIG. 1. When the heel-in configuration was used in conjunction with a cambered blade profile, the turbine rotor was seen to have self-starting characteristics.

Figure 9:
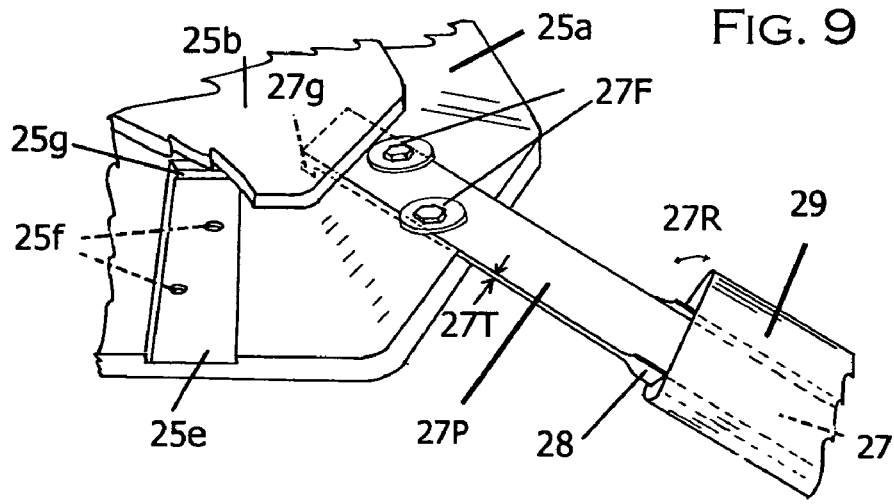
FIG. 9 is a detail assembly drawing of turbine blade attachment to a hub.
Figure 10:
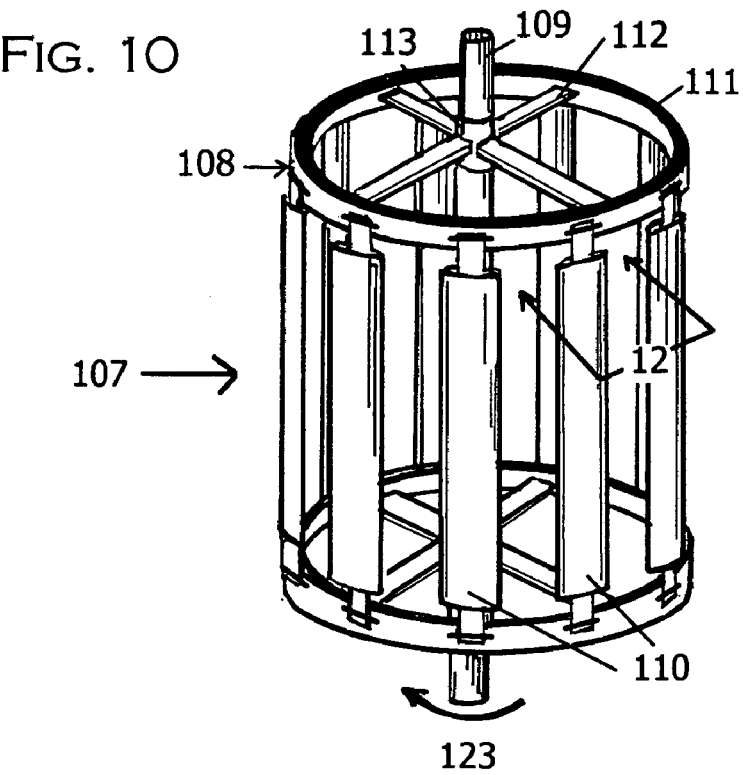
FIG. 10 is a view of an alternate embodiment of the blade structure invention.

FIGS. 8 and 9 show the connection and blade pivoting system of the invention based on assembly drawings at hub assembly 25 in FIG. 1. Blades 23 a through d in the figure are tied to a molded hexagonal hub section 25a by fasteners 27F. FIG. 9 shows I beam 26 extending beyond airfoil profile 29 and trimmed of flange portions 28 in the area between profile 29 and hub section 25a.

Web section 27 continues as flattened portion 27P toward the hub and has a thickness 27T, a width 27W and a length 27L in that area. Combined with the torsional properties of the pultruded web section, the dimensions of in that area can be used to fine tune the spring response, indicated by arrow 27R of airfoil profile 29 to the centrifugal and aerodynamic forces on it. The torsional modulus of the material and the moment of inertia as defined by the flattened portion dimensions are chose so as not to exceed the elastic limit of the material under expected loads encountered, so that the blade will always return to the same rest pitch position after rotation.

Locking cap 25b with an integral molded fastener 25c is shown detached in FIG. 8 and secured to hub section 25a in FIG. 9. As shown in FIG. 8, fastener 25c is inserted through hole 25d in the assembly process to secure the blades and I beams 26 a through d to hub section 25a. At the end of each web section 27 a small ledge 27g is formed by an overmolding process after flange portions 28 have been trimmed.

Each trimmed web section 27P fits into a rectangular slot 25e in hub section 25a with a ledge 27g fitting into with a deeper channel 25g during field assembly of blades 23 to hub sections 25a. The field assembly is completed by inserting and tightening fasteners 27F into threaded holes 25f at slots 25e, securing non-blade struts 24a and 24b in a similar fashion and aligning/locking all six components to the plane of hub section 25a with locking cap 25b.

Non-blade struts 24a and 24b, as illustrated in FIG. 8, can have a more circular cross sectional profile compared to airfoil profile 29 to optimize strength to weight ratio and also be adapted to receive I beam sections (not numbered) similar to 26a to d for attachment to hub section 25a.

Figure 13:
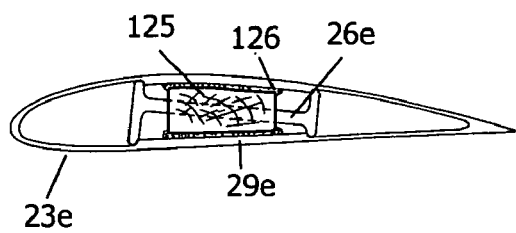
FIG. 13 is a cross section of an alternate material use using a wood insert.
Figure 14:
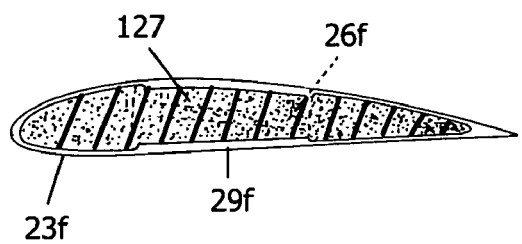
FIG. 14 is a cross section of an alternate material use using a foam filled airfoil.

FIGS. 13 and 14 show a materials arrangements for further reducing turbine blade cost which can be employed using the system. FIG. 13 is a section through an alternate materials construction of the invention, with aerodynamic profile 29e of blade 23e, connected to an assymetrical I beam 26e only at the ends of the blade. A light weight wood section 125 is bonded to profile 29e with adhesive 126 at the center of a blade span to transfer the load between the sides of profile 29e in that area. Wood varieties such as pine, fir, ash and hickory would be ideal in this application.

FIG. 14 illustrates a foam section 127 performing a similar function at mid-span of blade 23f, with assymetrical I beam 26f shown in dotted lines behind. Any number of readily available foam systems with load transfer properties, such as urethane foams and styrene foams could be used to transfer the load between the sides of profile 29f.

Figure 15:
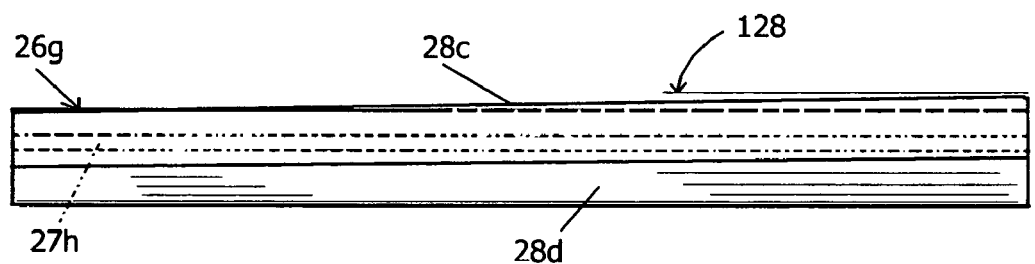
FIG. 15 is a part drawing of an alternate shape for the composite blade beam.
Figure 16:
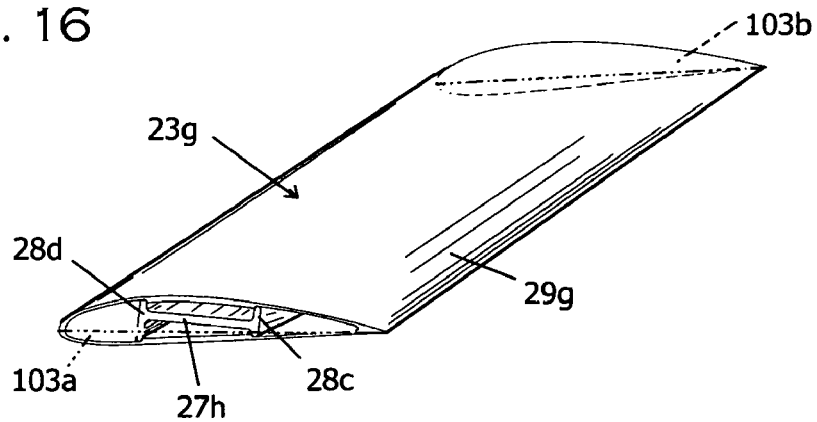
FIG. 16 is an isometric drawing of a composite blade twisted along its longitudinal axis.

FIGS. 15 and 16 illustrate how the two part blade assembly might be used to introduce a twist into a uniform cross section blade, desirable in many small to medium sized horizontal axis blade turbines, (e.g. used in FIG. 1). Referring to FIG. 16, chord line 103a of airfoil profile 29g in the foreground is shown as roughly horizontal, while chord line 103b in the background can be seen to be pitched upward at the trailing edge.

Assymetrical I beam 26g is shown in elevation in FIG. 15, with smaller flange 28c in the foreground and larger flange 28d behind. Beam 26g can be manufactured in a pultrusion process with flange 28c somewhat wider than shown in the figure. A shallow draft angle 128 (relative to the bottom of flange 28d) can be formed by linearly trimming flange 28c at the top and bottom. The spacing between contact points to the airfoil is maintained by the constant width of web section 27h, while the trailing edge is forced upward by angle 128. Profile 29g can then be produced by a thermoset system with some post cure (as is known for urethane pultrusions) or can be produced using a filled thermoplastic material or a thin, laminated material as shown in FIG. 4b, slid over I beam 26b and bonded in place.

A number of small and mid-scale applications for distributed power such as electrical generation in the 1 to 15 kilowatt range and water pumping using traditional multi-blade horizontals would be ideally suited to use of strong, lightweight, low cost blades as illustrated in FIGS. 15 and 16.

Mode of Operation: Blade Pitch Control System

FIGS. 6 and 7 illustrate the operation of a simple pivoting mechanism 106. FIG. 6 additionally shows a blade leading edge 29C, a blade trailing edge 29T with the center of mass of the blade located roughly at the arrow head of character 26, (slightly forward of the center of web section 27).

Centrifugal force alone on the blade when the blade is at position 101c at higher rotational speed is prone to reduce the heel-in angle of blade 23. The orientation of the blade at position 101c at high speed is shown in FIG. 7 to have been influenced by pivoting action, arrow 102c, being closer to a tangential orientation than angle 29h in FIG. 6.

A cross flow of air at higher rotational speeds due to a partial Magnus effect or other aerodynamic forces appears to shift the effective air flow direction from arrow 100a (slow speeds) to arrow 100a" at blade position 101a. As shown by arrow 102a in FIG. 7, this local cross flow tends to increase the heel-in angle at position 101a relative to that shown in FIG. 6. In turn, this reduces the angle of attack of blade 23 at position 101a at high speed, reducing the tendency to stall at that point. Arrow 100e in the figure shows by-pass flow of air further away from turbine rotor 21.

By increasing the ratio of blade area to swept area, often called the solidity ratio of the turbine, this Magnus effect can be increased in the rotor design. In FIG. 7 this factor is illustrated by the relative lengths of airfoil chord distance 103c and the open area between blades, length 103o. While increasing drag at higher speeds, this approach can be used to fine tune the low wind speed response of the turbine to optimize performance in areas and installations with moderate winds.

An alternative interpretation of the cross flow phenomenon, not inconsistent with a Magnus effect, is slight pressure drop inside the circle of rotation of the blades due to the aerodynamic and frictional losses of the air flow passing the blades. Theories of operation are presented here to illustrate the performance of system as observed in testing.

Lift force at high rotational speeds from blade position 101a, indicated by vector 23L", is likely to be a major component of the overall torque. Relative velocity of blade 23 to the local air flow, 100a", is highest when the blade is approaching the prevailing wind 100b and the angle of attack may be favorable due to the increased heel-in angle.

At high rotational speeds with a rotor tip speed ratio greater than 1, blade 23 at position 101c is moving faster than by-pass air flow 100c. In FIG. 7, the blade can be seen as 'flying upside down' with a lower lift force 23L' (relative to 23L" at position 101b.) Though the blade is not at an ideal angle of attack, the pitching motion indicated by arrow 102c has improved the angle of attack from what it might have been remaining at angle 29h shown in FIG. 6.

The pivoting effect at blade position 101b at high rotational speeds is indeterminate as indicated by double headed arrow 102b. Deflection inward toward the mast by prevailing wind 100b is likely to be balanced by outward centrifugal force. At the mid-point heel-in angle shown in FIG. 6, the vector sum 100b" of the rotational velocity and the prevailing wind 100b is likely to present an advantageous angle of attack for blade 23.

By producing lift through about three fourths of the rotational cycle, (functionality at blade position 101d has not been analyzed) it is easy to see how Sicard, Drees and others achieved high aerodynamic efficiency in vertical axis turbines. The alternate embodiment of blade deflection system 106 shown in FIGS. 10 through 12 applies the same type of composite torque spring mechanism to replace the more complex pivot rod, mechanical spring, cams used in the cylindrical rotor designs used in this area of the prior art.

DETAILED DESCRIPTION

Cylindrical Vertical Axis Turbine

An alternate embodiment of the invention using the blade pivot system 106 illustrated in FIG. 7 is shown in FIGS. 1 through 12. While similar in overall geometry to the prior art of Drees/Sicard etc, the use of composite strip 115 in the pivoting of blades 110 represents a significant advance in terms of simplicity of operation, reduced parts cost and greatly reduced manufacturing costs.

Turbine rotor assembly 108 consists of upper and lower hoop sections 111 mounted to a central mast 109 by means of spokes 112 and mast junctions 113. Capture of wind 107 by the turbine rotor results in mechanical rotation 123 which can be tied to a generator 45 as illustrated in FIG. 2 or other driven devices based on the particular application.

Figure 11:
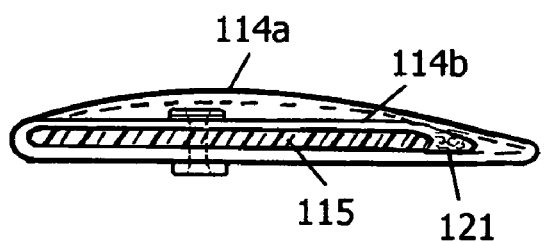
FIG. 11 is a cross section of a pivoting blade assembly using a composite sheet.
Figure 12:
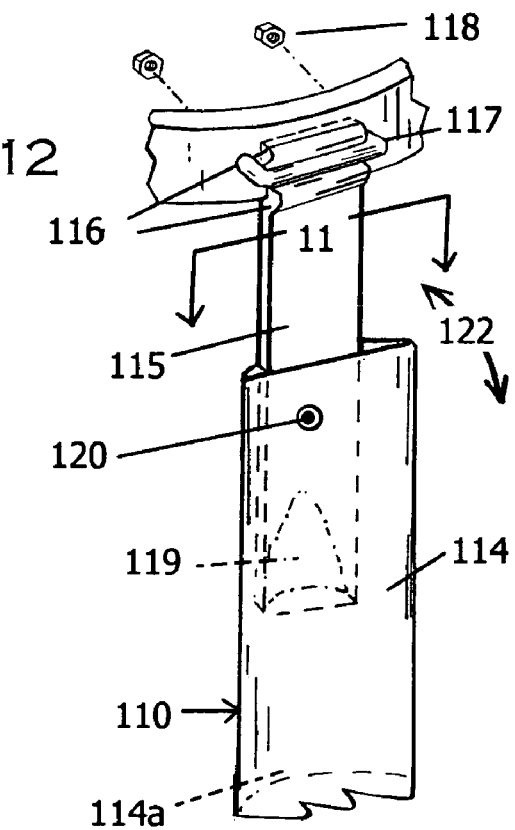
FIG. 12 is a detail isometric assembly drawing of the turbine blade hubs shown in FIG. 10.

Referring to FIGS. 11 and 12, each blade 110 is composed of an airfoil portion 114 which has a curved section 114a throughout most of its length and is flattened to a shape 114b which conforms to flattened composite strip 115 at each end. An adhesive 121 bonds the airfoil portion to the composite strip. An optional composite section 119 can be over-molded onto composite strip 115 where the transition between shape 114a and 114b occurs to prevent pull out of the strip during use. An optional rivet 120 can also be used to prevent pull out of strip 115 from airfoil portion 114.

A metal U-bolt 117 is shown holding blade 110 in position against hoop 112. Over-molded composite nibs 116 serve to position blade 110 at the proper level against hoop 112 and lock it in place. Nuts 118 are threaded onto U-bolt 117 to complete the assembly. Arrow 122 in FIG. 12 shows the pitch deflection of the blade throughout the rotational cycle of rotor 108 in much the same way arrows 102 a through c illustrated the mode of operation in FIG. 7.

Composite strip 114 is preferably a high pressure laminate composite material saw cut from a larger sheet as described in FIG. 4b. Airfoil portion 114 is preferably an aluminum extrusion to allow for low tooling and materials costs for the cylindrical turbine. Hoops 111 can either be rolled metal or a specially formed high pressure composite laminate. Spokes 112 and mast 109 are preferably made from composite pultrusions as illustrated in FIG. 4a.

Like turbine rotor 21 in FIG. 1, turbine rotor 108 can be easily transported and assembled on site from a compact, light weight package.

DETAILED DESCRIPTION

Solar Array Supports and Panels

Figure 17:
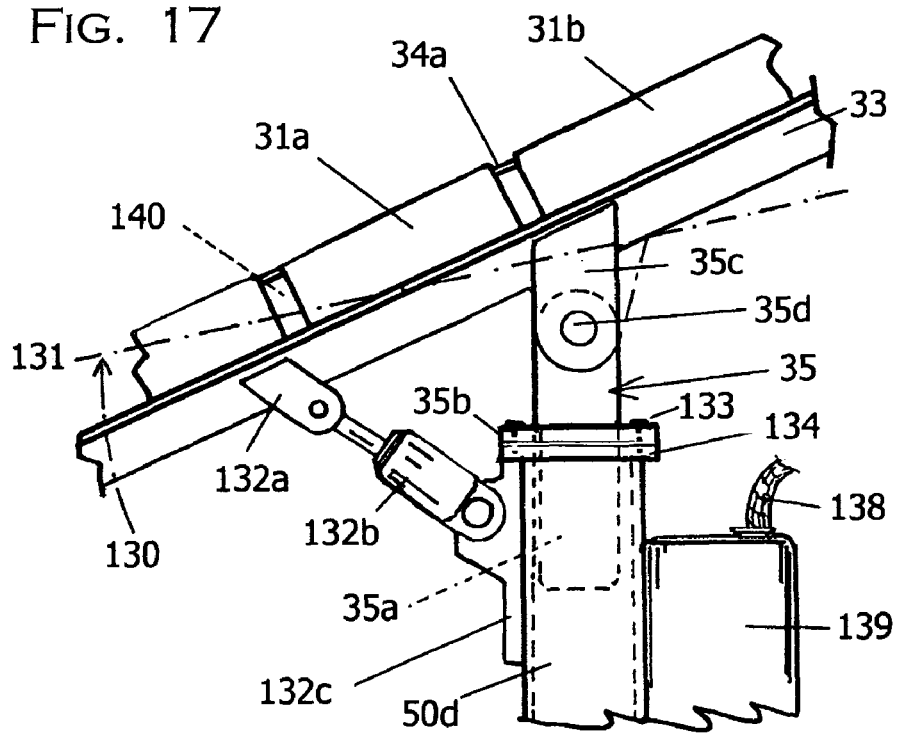
FIG. 17 is a side view elevation of the solar array structure
Figure 18:
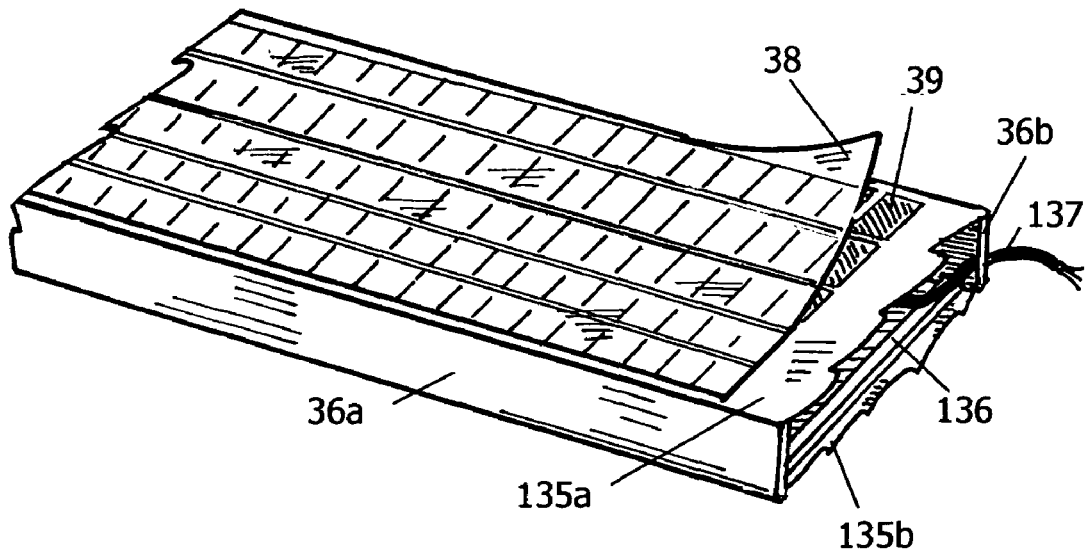
FIG. 18 is a cut away drawing of a typical photovoltaic/ structural panel

FIGS. 17 and 18 are detail drawings of the solar/structural array of FIG. 1 and a typical solar structural panel 31. Perimeter frame 32 has been removed from the view to see the structural attachments between the panels, the intermediate beams and the stanchion.

Hinged connector 35 consists of an anchor blade portion 35a which is set into a slot (as illustrated in FIGS. 2 and 3) which continues up to receive a pivot pin 35d. The blade portion passes through a lower flange 134 bonded to stanchion 50d and an upper flange 35b bonded to the anchor blade portion. Upper clevis plates 35c are attached to intermediate beam 33 and are fitted to the pivot pin in the field. Beam 33 is shown as a Tee shaped beam and is preferably made from a composite material as illustrated in FIG. 4a, but a metal beam is an acceptable alternative. The joint between the hinged connector and the stanchion is shown reinforced by bolts 133 between the upper and lower flanges.

Hydraulic cylinder 132b is used to pivot the deck about pin 35d and is attached to bracket 132a at the beam and bracket 132c mounted to stanchion 50d. Dash dot line 131 indicates the bottom line of beam 33 when pivoted upward (arrow 130) by the action of cylinder 132.

Solar structural panels 31 are pre-fabricated and pre-wired for the photovoltaic cells 39 attached to upper skin 135a. The frame of the panel consists of upper skin 135a and lower skin 135b adhesively bonded to integral purlins 36a and 36b which receive cross braces 136. Electrical output wiring 137 is shown passing through purlin 36b and in practice would lead into an inter-panel space 140 for routing to a conduit 138 which enters a voltage regulator and controller 139 mounted on stanchion 50d. Controller 139 has the same function as panel 44 in the stanchion fitted with a wind system. A weather and UV light resistant cover sheet 38 is bonded to the panel and insulates/protects photovoltaic cells 39. Cover sheet 38 is preferably made from polycarbonate, acrylic or polyvinylidene fluoride material. Since deflection resistance is provided by upper skin 135a, the weight and cost of a glass cover sheet is not needed.

I claim:
1. A vehicle recharging system for electric or hybrid vehicles comprising;

a stanchion, said stanchion elongated in a first direction and having means to secure said stanchion to a base at one end and to secure a renewable energy capture device at the other end and transverse to said first direction having two flanges separated and joined by at least one web section, said web section having a face surface contiguous with said flanges, said face surface and said flanges bounding a rectangular cavity on either side of said stanchion and having a number of electrical storage devices with dimensions less than said rectangular cavity transverse to said first direction and secured to said stanchion by means of a number of brackets bonded to said stanchion with said renewable energy capture device having an energy output and said vehicle recharging system further including a control device capable of transforming said energy output to a form usable by said electrical storage devices and a control device capable of distributing said energy output to said electrical storage devices and said electrical storage devices having the capability to release energy to one or more pieces of energy use equipment at the direction of a distribution control device, with at least one of said pieces of energy use equipment comprising a charging plug, whereby renewable energy can be economically captured and used in a populated area for direct recharging of electric and plug-in hybrid vehicles.

2. The vehicle charging system of claim 1, wherein said at least one web section comprises two web sections, said two web sections separated by a slot bounded by said two web sections and said two flanges and said means to secure said base comprises a post integral to said base, said post engaging said slot and further including several fasteners passing through said two web sections and said post in the assembled system, whereby torsional displacement of said stanchion from its vertical position can be resisted.

3. The vehicle charging system of claim 1, wherein said means to secure said base comprises a base plate having an upper surface and a lower surface as part of said base, with two blocks bonded to said upper surface, said two blocks separated by at least one gap with the width of said at least one gap being slightly larger than the thickness of said at least one web section, and with said at least one web section contained within said at least one gap and with an optional fastener passing through said two blocks and said at least one web section in the assembled system.

4. The vehicle charging system of claim 1, wherein said base includes a base plate having integral means to interlock with said stanchion and said means to secure said base comprises an adhesive joint between said integral means and said stanchion, whereby the base and the stanchion can be shipped to a job site as a pre-assembled unit.

5. The vehicle charging system of claim 1, wherein said electrical storage devices comprise electrical batteries.

6. The vehicle charging system of claim 1 wherein said renewable energy capture device comprises a wind turbine coupled to an electrical generator.

7. The vehicle charging system of claim 6, wherein said wind turbine comprises a vertical axis wind turbine.

8. The vehicle charging system of claim 1 wherein said renewable energy capture device comprises a solar array.

9. The vehicle charging system of claim 8 wherein said solar array comprises a number of photovoltaic panels.

10. The vehicle charging system of claim 9 wherein said photovoltaic panels include integral purlins spanning intermediate beams, with each said intermediate beam tied to one of said stanchions.

11. The vehicle charging system of claim 10, further including a hinged connection between each said intermediate beam and said stanchions and means to vary the pitch of said solar array.

12. The vehicle charging system of claim 1, wherein said stanchion is composed of a fibrous reinforcement within a matrix of thermoset resin material, where said fibrous reinforcement can a combination of fiberglass unidirectional rovings, stitched triaxial fiberglass fabric, non-woven glass fabric and stitched 0/90 glass fabrics and said thermoset resin material is selected from a list including epoxy, urethane, phenolic, polyester and vinyl polymers, whereby: said stanchion can be produced easily using the continuous composite production process of pultrusion.

13. The vehicle charging system of claim 1, wherein said stanchion is composed of a fibrous reinforcement within a matrix of resin material, where said fibrous reinforcement is selected from a list including cellulose based fibers, other natural product fibers, carbon based fibers, glass fibers, aramid and other high strength organic fibers, rock wool fibers or fibers produced from lava deposits.

14. The vehicle charging system of claim 1, wherein said stanchion is composed of metal.

15. The vehicle recharging system of claim 1, further including a facing panel secured to said stanchion and covering said rectangular cavity.

16. The vehicle recharging system of claim 2, wherein said means to secure said renewable energy capture device comprises an anchor blade engaging said slot with several fasteners passing through said two web sections and said anchor blade.

17. The vehicle recharging system of claim 2, further including a circuit board mounted within said slot, said circuit board having electrical wiring connecting said electrical storage devices, said control devices, said distribution control device and said energy use equipment.

18. The vehicle recharging system of claim 1, further including a user interface module capable of communicating payment information to said distribution control device and capable of communicating vehicle charging information to a user.

19. The vehicle recharging station of claim 1, wherein one of said pieces of energy use equipment includes a grid connected panel, whereby said grid connected panel can alternately supply energy to said vehicle recharging station or receive energy from said vehicle recharging station.

20. The vehicle recharging station of claim 1, wherein one of said pieces of energy use equipment includes a light post.

* * * * *